(12) United States Patent
Inoue

(10) Patent No.: US 9,812,983 B2
(45) Date of Patent: Nov. 7, 2017

(54) SYNCHRONOUS RECTIFIER CIRCUIT

(71) Applicant: ROHM CO., LTD., Ukyo-Ku, Kyoto (JP)

(72) Inventor: Naoki Inoue, Kyoto (JP)

(73) Assignee: ROHM CO., LLTD., Ukyo-Ku, Kyoto (JP)

(\*) Notice: Subject to any disclaimer, the term of this patent is extended or adjusted under 35 U.S.C. 154(b) by 0 days.

(21) Appl. No.: 15/153,932

(22) Filed: May 13, 2016

(65) Prior Publication Data
US 2016/0344302 A1 Nov. 24, 2016

(30) Foreign Application Priority Data
May 18, 2015 (JP) .................... 2015-101298

(51) Int. Cl.
*H02M 7/219* (2006.01)
*H02M 1/00* (2006.01)

(52) U.S. Cl.
CPC .... *H02M 7/219* (2013.01); *H02M 2001/0009* (2013.01); *H02M 2001/0025* (2013.01); *H02M 2001/0048* (2013.01); *H02M 2007/2195* (2013.01); *Y02B 70/1408* (2013.01); *Y02B 70/1491* (2013.01)

(58) Field of Classification Search
CPC ........... H02M 1/08; H02M 2001/0009; H02M 2007/2195; H02M 7/219
See application file for complete search history.

(56) References Cited

U.S. PATENT DOCUMENTS

| 8,278,889 | B2 | 10/2012 | Tateishi | |
|---|---|---|---|---|
| 8,441,238 | B2* | 5/2013 | Chen | H02M 3/1588 323/222 |
| 2013/0241304 | A1* | 9/2013 | Bae | H04B 5/0037 307/104 |
| 2013/0314958 | A1* | 11/2013 | Kern | H02J 3/383 363/80 |
| 2014/0111168 | A1* | 4/2014 | Chen | H02M 3/1588 323/235 |
| 2015/0117076 | A1* | 4/2015 | Zhang | H02M 7/219 363/127 |

\* cited by examiner

*Primary Examiner* — Adolf Berhane
*Assistant Examiner* — Bart Iliya
(74) *Attorney, Agent, or Firm* — Cantor Colburn LLP

(57) ABSTRACT

A first variable voltage source VS1 generates a first threshold voltage $V_{ZC1}$ which is variable. A first zero current detection comparator ZC_CMP1 compares a first voltage $V_{AC1}$ at a first input node AC1 with the first threshold voltage $V_{ZC1}$, and generates a ZC_DET1 signal which indicates a comparison result. A first adjustment comparator ADJ_CMP1 compares the first voltage $V_{AC1}$ with a first reference voltage $V_{TH1}$. A first adjustment unit adjusts the first threshold voltage $V_{ZC1}$ generated by the first variable voltage source VS1, based on the output VF_DET1 of the first adjustment comparator ADJ_CMP1. A control logic switches the state of a bridge circuit according to at least the first detection signal ZC_DET1.

18 Claims, 10 Drawing Sheets

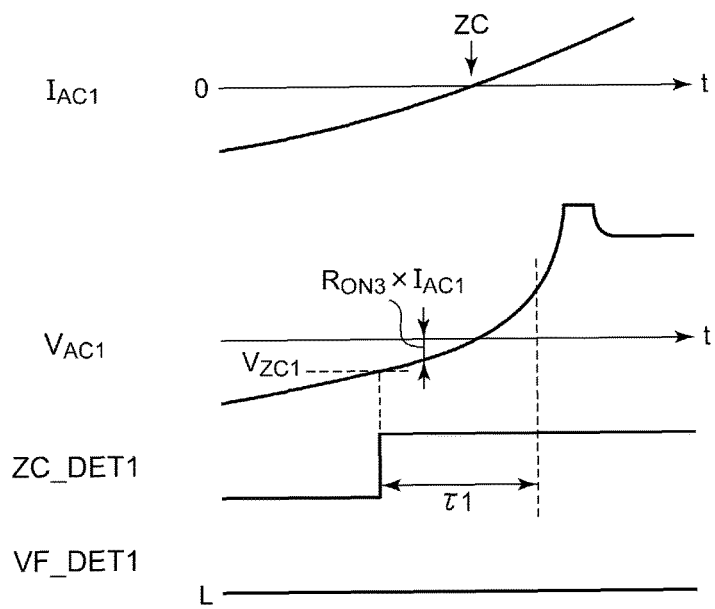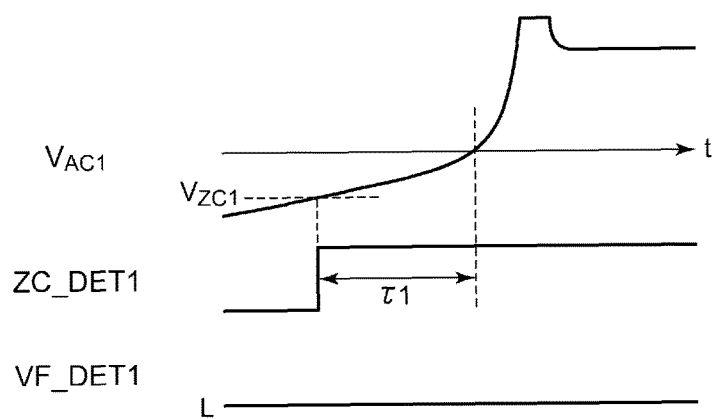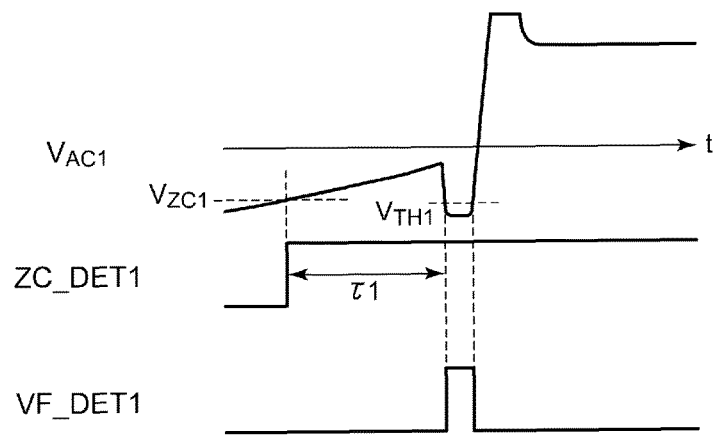

SYNCHRONOUS RECTIFIER CIRCUIT

CROSS-REFERENCE TO RELATED APPLICATIONS

This application is based upon and claims the benefit of priority from the prior Japanese Patent Application No. 2015-101298, filed May 18, 2015, the entire contents of which are incorporated herein by reference.

BACKGROUND OF THE INVENTION

1. Field of the Invention

The present invention relates to a synchronous rectifier circuit.

2. Description of the Related Art

In order to rectify an AC signal, a rectifier circuit is employed. Known examples of such a rectifier circuit include a diode bridge circuit employing diodes and a synchronous rectifier circuit employing transistors (switches). FIG. 1 is a circuit diagram showing a synchronous rectifier circuit. A synchronous rectifier circuit 100 includes a first transistor M1 through a fourth transistor M4 connected in the form of a bridge circuit, diodes D1 through D4, and a control circuit 200. The control circuit 200 turns on and off, in a complementary manner, a first pair consisting of the first transistor M1 and the fourth transistor M4, which are oppositely positioned, and a second pair consisting of the second transistor M2 and the third transistor M3, which are oppositely positioned. The output of the synchronous rectifier circuit 100 is connected to a smoothing capacitor 120. Input terminals AC1 and AC2 of the synchronous rectifier circuit 100 allow an unshown circuit to input or otherwise to output AC currents $I_{AC1}$ and $I_{AC2}$ to or otherwise from the synchronous rectifier circuit 100, with phases that are the reverse of each other. The direction of the current $I_{AC1}$ or $I_{AC2}$ that flows to the synchronous rectifier circuit 100 will be referred to as the "positive direction".

A diode bridge circuit requires no complicated control operation, and accordingly requires only a simple configuration. However, such a diode bridge circuit has a problem of power loss due to voltage drop across the diodes. The synchronous rectifier circuit 100 employs transistors that each have a low on resistance, i.e., that each involve only a small voltage drop, thereby providing an advantage of little power loss. Thus, in a case of ideally operating the synchronous rectifier circuit 100, such an arrangement provides high-efficiency rectification operation.

FIGS. 2A through 2C are waveform diagrams each showing the operation of the synchronous rectifier circuit 100. It should be noted that the vertical axis and the horizontal axis shown in the waveform diagrams and the time charts in the present specification are expanded or reduced as appropriate for ease of understanding. Also, each waveform shown in the drawing is simplified or exaggerated for emphasis for ease of understanding. In order to operate the synchronous rectifier circuit 100 with high efficiency, there is a need to switch each transistor with a timing at which the current I becomes zero (zero-crossing point). Such an operation will be referred to as the "zero current switching".

FIGS. 2B and 2C each show the current $I_{AC1}$ and the voltage $V_{AC1}$ in the vicinity of a zero current point. FIG. 2B shows an ideal operation with high efficiency. In this operation, each switch is switched at the same time as the zero-crossing point of the current $I_{AC1}$.

The control circuit 200 detects such a zero-crossing timing using any particular method. Furthermore, the control circuit 200 switches the circuit state immediately after the zero-crossing timing. However, in actuality, the zero-crossing timing detection requires a predetermined time period, leading to a non-negligible delay in the zero-crossing timing detection. Furthermore, a control delay and propagation delay occur before the circuit state switches after the zero-crossing timing is detected. FIG. 2C shows a case in which there is a delay τ before the circuit state switches after the zero-crossing timing $t_{ZC}$ occurs. During the delay τ, the first transistor M1 is turned off. In this state, the current $I_{AC1}$, which is input to the synchronous rectifier circuit 100 via the AC1 terminal, flows through the diode D1 arranged in parallel with the first transistor M1, which leads to degraded efficiency. In particular, in a case of inputting the current $I_{AC}$ having a high frequency, such a delay τ has a serious adverse effect on efficiency, i.e., leads to marked degradation in efficiency.

SUMMARY OF THE INVENTION

The present invention has been made in order to solve such a problem. Accordingly, it is an exemplary purpose of an embodiment of the present invention to provide a synchronous rectifier circuit having improved efficiency.

An embodiment of the present invention relates to a control circuit that forms a synchronous rectifier circuit together with a bridge circuit. The bridge circuit comprises: a first transistor arranged between a first input node and a rectification node; a second transistor arranged between a second input node and the rectification node; a third transistor arranged between the first input node and a reference node; and a fourth transistor arranged between the second input node and the reference node. The control circuit comprises: a first variable voltage source that generates a first threshold voltage which is variable; a first zero current detection comparator that compares a first voltage at the first input node with the first threshold voltage, and that generates a first detection signal having a first level when the first voltage is higher than the first threshold voltage and having a second level when the first voltage is lower than the first threshold voltage; a first adjustment comparator that compares the first voltage with a first reference voltage; a first adjustment unit that adjusts the first threshold voltage generated by the first variable voltage source, based on an output of the first adjustment comparator; and a control logic that switches a state of the bridge circuit according to the first detection signal.

Such an embodiment allows the first threshold voltage to be adjusted such that it has a voltage level that corresponds to ideal zero-current switching. This provides improved efficiency.

In an embodiment, the first adjustment unit may comprise an up/down counter that selects one from among a count up operation and a count down operation, according to an output of the first adjustment comparator. Also, the first adjustment voltage may be set according to a count value of the up/down counter.

[Negative Side Detection]

In an embodiment, the first threshold voltage may be variable in the vicinity of zero. Also, the first reference voltage may be configured as a negative voltage. Also, when the first detection signal becomes the first level, the control logic may instruct the bridge circuit to transit from a first state in which a pair of the first transistor and the fourth transistor are turned off and a pair of the second transistor and the third transistor are turned on, to a second state in which the first transistor through the fourth transistor are turned off.

In an embodiment, with a forward voltage of a diode as Vf, the first reference voltage may be set to be higher than −Vf.

Such an arrangement is capable of appropriately detecting a state in which a current flows through a diode arranged in parallel with the third transistor.

In an embodiment, the control circuit may further comprise a second zero current detection comparator that compares a second voltage at the second input node with a second threshold voltage, and that generates a second detection signal having a first level when the second voltage is higher than the second threshold voltage, and having a second level when the second voltage is lower than the second threshold voltage. Also, when the second detection signal becomes the first level, the control logic may instruct the bridge circuit to transit from a third state in which a pair of the second transistor and the third transistor are turned off and a pair of the first transistor and the fourth transistor are turned on, to a fourth state in which the first transistor through the fourth transistor are turned off.

In an embodiment, the control circuit may further comprise: a second variable voltage source that generates the second threshold voltage which is variable; a second adjustment comparator that compares the second voltage with a second reference voltage configured as a negative voltage; and a second adjustment unit that adjusts the second threshold voltage generated by the second variable voltage source, based on an output of the second adjustment comparator.

Such an embodiment allows the second threshold voltage to be adjusted such that it has a voltage level that corresponds to ideal zero-current switching. This provides further improved efficiency.

In an embodiment, when the second detection signal becomes the second level, the control logic may instruct the bridge circuit to transit from the second state to the third state. Also, when the first detection signal becomes the second level, the control logic may instruct the bridge circuit to transit from the fourth state to the first state.

Such an arrangement requires only two comparators to detect a zero-current point. This allows the circuit area to be reduced.

In an embodiment, the first zero current detection comparator and the second zero current detection comparator may each be configured as a hysteresis comparator.

Such an arrangement is capable of adjusting a threshold value for controlling the transition from the second state to the third state, and a threshold value for controlling the transition from the fourth state to the first state, according to the hysteresis width.

In an embodiment, the control circuit may further comprise: a third zero current detection comparator that compares the first voltage with a third threshold voltage, and that generates a third detection signal which indicates a comparison result; and a fourth zero current detection comparator that compares the second voltage with a fourth threshold voltage, and that generates a fourth detection signal which indicates a comparison result. Also, the control logic may instruct the bridge circuit to transit from the second state to the third state according to one from among the third detection signal and the fourth detection signal. Also, the control logic may instruct the bridge circuit to transit from the fourth state to the first state according to the other signal from among the third detection signal and the fourth detection signal.

This allows the third and fourth threshold voltages to be set independently of adjustment of the first and second threshold voltages.

[Positive Side Detection]

In an embodiment, the first threshold voltage may be variable in the vicinity of a rectified voltage at the rectification node. Also, the first reference voltage may be configured as a positive voltage that is higher than the rectified voltage. Also, when the first detection signal becomes the second level, the control logic may instruct the bridge circuit to transit from a third state in which a pair of the second transistor and the third transistor are turned off and a pair of the first transistor and the fourth transistor are turned on, to a fourth state in which the first transistor through the fourth transistor are turned off.

Also, with a forward voltage of a diode as Vf, and with the rectified voltage as $V_{RECT}$, the first reference voltage may be set to be lower than $(V_{RECT}+Vf)$.

Such an arrangement is capable of appropriately detecting a state in which a current flows through a diode arranged in parallel with the first transistor.

In an embodiment, the control circuit may further comprise a second zero current detection comparator that compares a second voltage at the second input node with a second threshold voltage, and that generates a second detection signal having a first level when the second voltage is higher than the second threshold voltage, and having a second level when the second voltage is lower than the second threshold voltage. Also, when the second detection signal becomes the second level, the control logic may instruct the bridge circuit to transit from a first state in which a pair of the first transistor and the fourth transistor are turned off and a pair of the second transistor and the third transistor are turned on, to a second state in which the first transistor through the fourth transistor are turned off.

In an embodiment, the control circuit may further comprise: a second variable voltage source that generates the second threshold voltage which is variable; a second adjustment comparator that compares the second voltage with a second reference voltage configured as a positive voltage; and a second adjustment unit that adjusts the second threshold voltage generated by the second variable voltage source, based on an output of the second adjustment comparator.

In an embodiment, when the first detection signal becomes the first level, the control logic may instruct the bridge circuit to transit from the second state to the third state. Also, when the second detection signal becomes the first level, the control logic may instruct the bridge circuit to transit from the fourth state to the first state.

In an embodiment, the first zero current detection comparator and the second zero current detection comparator may each be configured as a hysteresis comparator.

In an embodiment, the control circuit may further comprise: a third zero current detection comparator that compares the first voltage with a third threshold voltage, and that generates a third detection signal which indicates a comparison result; and a fourth zero current detection comparator that compares the second voltage with a fourth threshold voltage, and that generates a fourth detection signal which indicates a comparison result. Also, the control logic may instruct the bridge circuit to transit from the second state to the third state according to one from among the third detection signal and the fourth detection signal. Also, the control logic may instruct the bridge circuit to transit from the fourth state to the first state according to the other signal from among the third detection signal and the fourth detection signal.

In an embodiment, the control circuit may be integrated on a single semiconductor substrate.

Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants.

Another embodiment of the present invention relates to a synchronous rectifier circuit. The synchronous rectifier circuit comprises: a bridge circuit; and any one of the aforementioned control circuits that each control the bridge circuit.

Yet another embodiment of the present invention relates to a wireless power receiving apparatus. The wireless power receiving apparatus comprises: a reception coil; a bridge circuit connected to the reception coil; and any one of the aforementioned control circuits that each control the bridge circuit.

Yet another embodiment of the present invention relates to an electronic device. The electronic device comprises the aforementioned wireless power receiving apparatus.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 5A through 5D are operation waveform diagrams each showing the operation of the synchronous rectifier circuit shown in FIG. 3;

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

Figure 1:
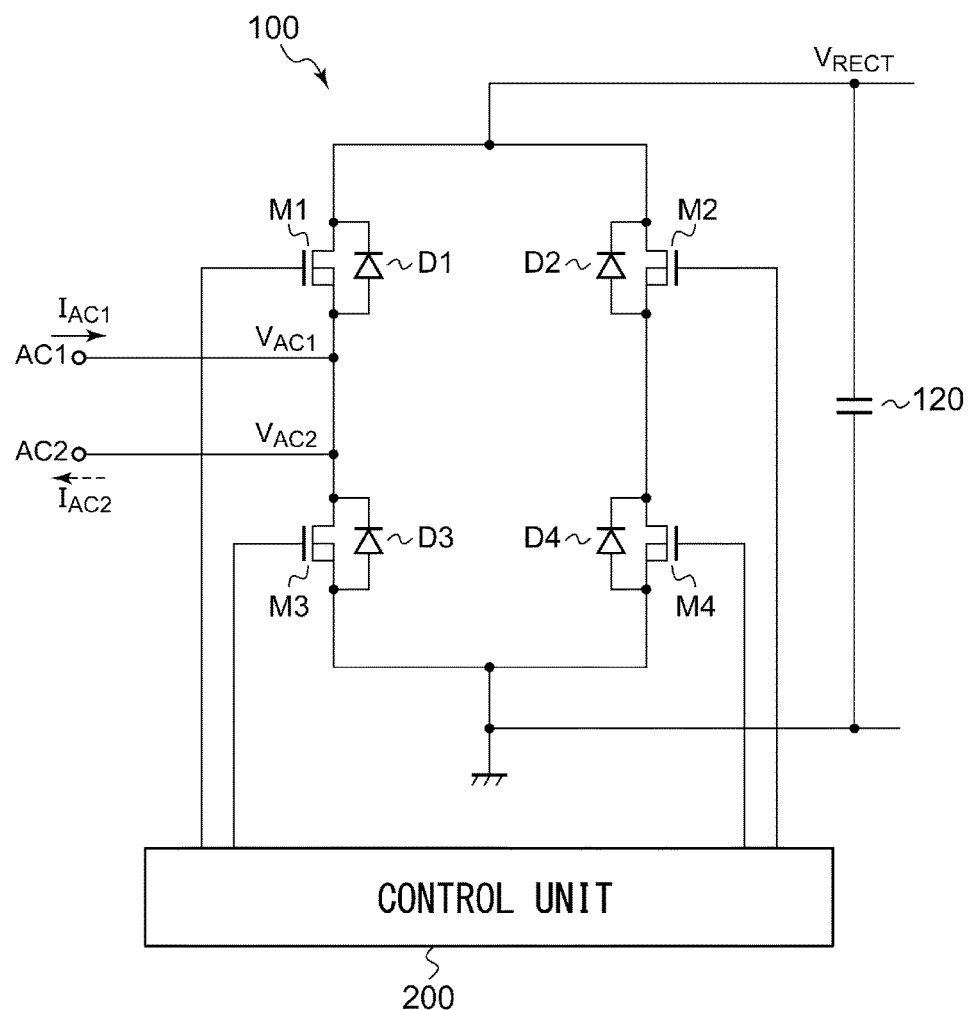
FIG. 1 is a circuit diagram showing a synchronous rectifier circuit.
Figure 2A:
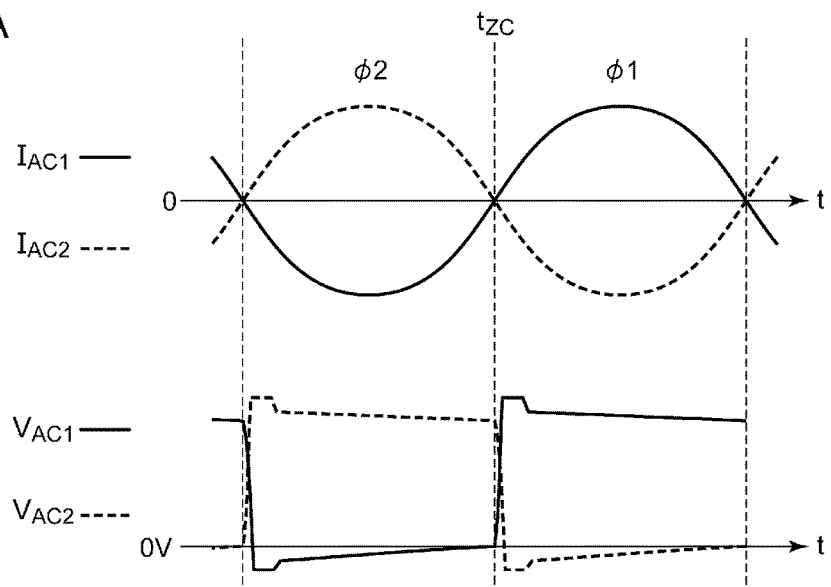
FIGS. 2A through 2C are waveform diagrams each showing the operation of the synchronous rectifier circuit.
Figure 2B:
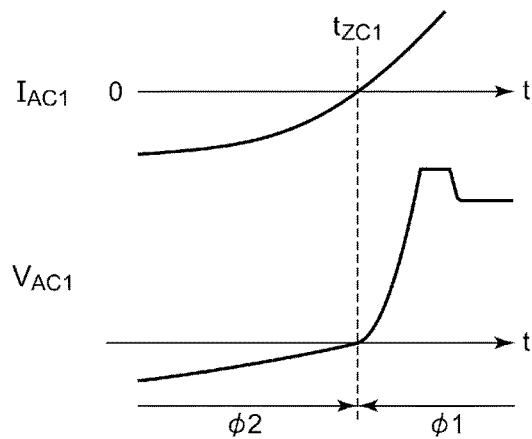
Figure 2C:
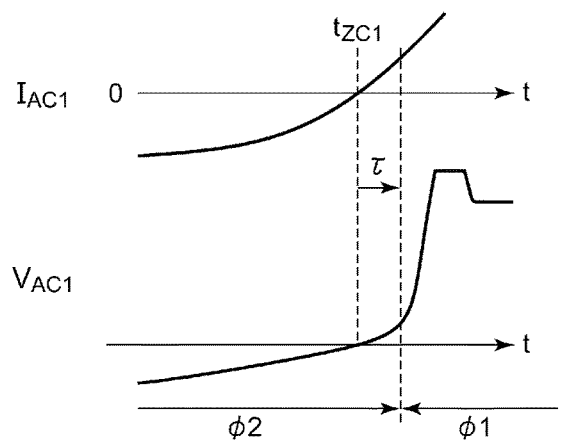
Figure 3:
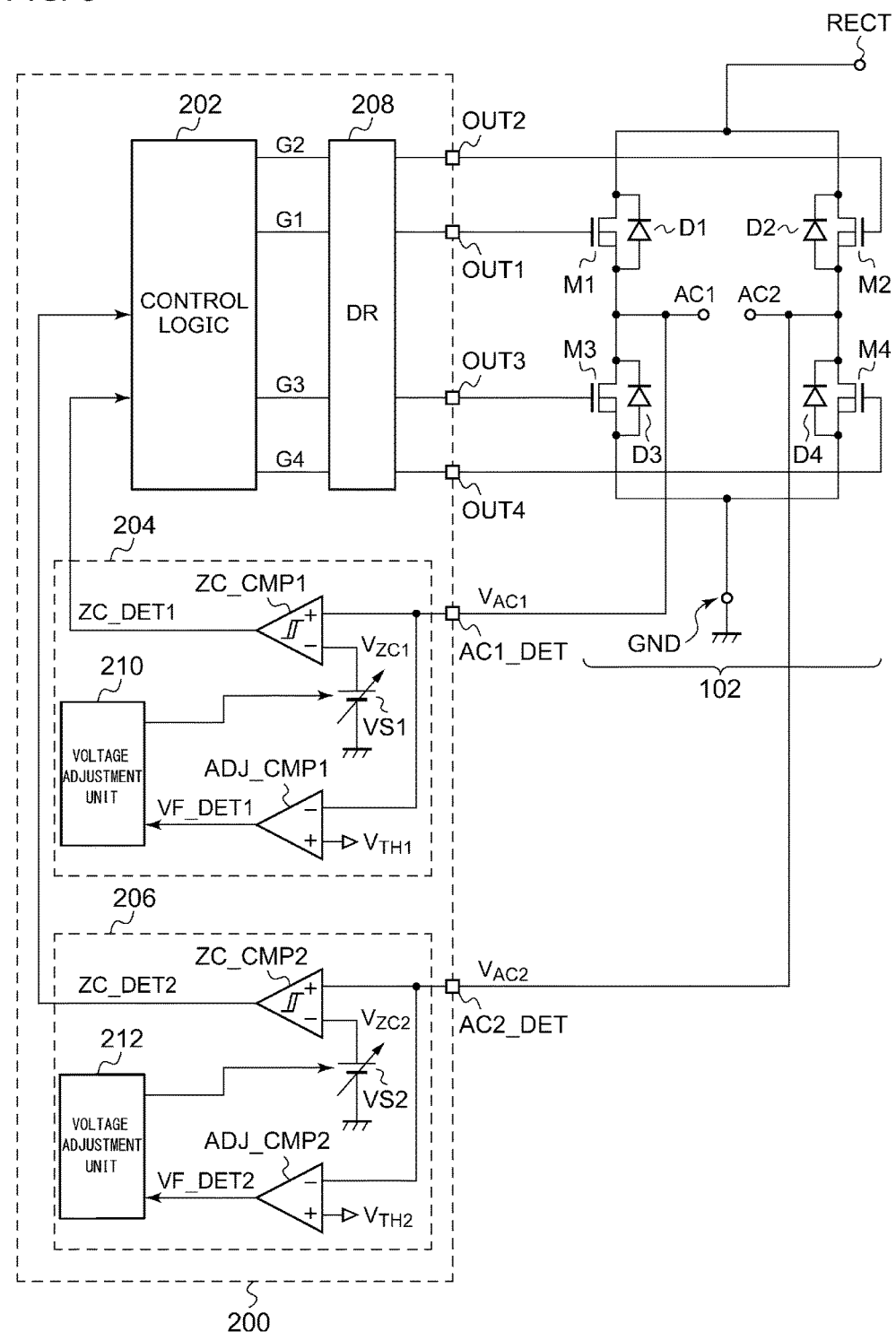
FIG. 3 is a circuit diagram showing a synchronous rectifier circuit including a control circuit according to an embodiment.

FIG. 3 is a circuit diagram showing a synchronous rectifier circuit 100 including a control circuit 200 according to an embodiment. The synchronous rectifier circuit 100 includes a bridge circuit 102 and the control circuit 200. The bridge circuit 102 includes an AC1 terminal (first input node), an AC2 terminal (second input node), a RECT terminal (rectification node), a GND terminal (reference node), a first transistor M1 through a fourth transistor M4 connected in the form of a bridge circuit, and diodes D1 through D4. The first transistor M1 is arranged between the AC1 terminal and the RECT terminal. The second transistor M2 is arranged between the AC2 terminal and the RECT terminal. The third transistor M3 is arranged between the AC1 terminal and the GND terminal. The fourth transistor M4 is arranged between the AC2 terminal and the GND terminal. The GND terminal is grounded. In the present embodiment, the first transistor M1 through the fourth transistor M4 are each configured as a MOSFET (Metal Oxide Semiconductor Field Effect Transistor). Also, each transistor may be configured using an IGBT (Insulated Gate Bipolar Transistor), a bipolar transistor, a GaN (gallium nitride) FET, or the like. Also, the first transistor M1 and the second transistor M2, which are each configured as a high-side transistor, may be configured using a P-channel (or PNP) transistor. Also, the diodes D1 through D4 may each be configured as a body diode of the parallel MOSFET. Otherwise, the diodes D1 through D4 may each be configured as a discrete element.

The control circuit 200 repeatedly switches its state between a state $\phi 1$ through a state $\phi 4$ as listed below.

[First State $\phi 1$]
The first transistor M1 is turned off.
The second transistor M2 is turned on.
The third transistor M3 is turned on.
The fourth transistor M4 is turned off.

[Second State $\phi 2$]
The first transistor M1 is turned off.
The second transistor M2 is turned off.
The third transistor M3 is turned off.
The fourth transistor M4 is turned off.

[Third State $\phi 3$]
The first transistor M1 is turned on.
The second transistor M2 is turned off.
The third transistor M3 is turned off.
The fourth transistor M4 is turned on.

[Fourth State φ4]

The first transistor M1 is turned off.
The second transistor M2 is turned off.
The third transistor M3 is turned off.
The fourth transistor M4 is turned off.

The control circuit 200 is configured as a function IC (Integrated Circuit) monolithically integrated on a single semiconductor substrate. The control circuit 200 includes output terminals OUT1 through OUT4 respectively connected to the gates of the first transistor M1 through the fourth transistor M4, a first detection terminal AC1_DET connected to the AC1 terminal, and a second detection terminal AC2_DET connected to the AC2 terminal.

The control circuit 200 includes a control logic 202, a first zero current detection circuit 204, a second zero current detection circuit 206, and a driver 208. The first zero current detection circuit 204 detects a zero-crossing point in the current $I_{AC1}$, based on the voltage $V_{AC1}$ at the AC1_DET terminal. Furthermore, the first zero current detection circuit 204 generates a first detection signal (ZC_DET1) having a level that is switched every time the zero-crossing point is detected.

Similarly, the second zero current detection circuit 206 detects a zero-crossing point in the current $I_{AC2}$, based on the voltage $V_{AC2}$ at the AC2_DET terminal. Furthermore, the second zero current detection circuit 206 generates a second detection signal (ZC_DET2) having a level that is switched every time the zero-crossing point is detected. It should be noted that the zero-crossing timing indicated by the ZC_DET1 signal or otherwise the ZC_DET2 signal does not necessarily match the current zero-crossing point in the strict sense. Rather, the zero-crossing timing thus detected can indicate a time point that is earlier in time than the precise current zero-crossing point.

The first zero current detection circuit 204 includes a first variable voltage source VS1, a first zero current detection comparator ZC_CMP1, a first adjustment comparator ADJ_CMP1, and a first adjustment unit 210.

The first adjustment variable voltage VS1 generates a first threshold voltage $V_{ZC1}$ which is variable and used to detect the zero-current point. The first threshold voltage $V_{ZC1}$ is set to a value in the vicinity of zero. Typically, the first threshold voltage $V_{ZC1}$ is set within a voltage range (minus several mV to minus several tens of mV) that is slightly lower than 0 V. The delay in the zero current detection decreases according to a reduction in the first threshold voltage $V_{ZC1}$. To the contrary, the delay in the zero current detection increases according to an increase in the first threshold voltage $V_{ZC1}$.

The first zero current detection comparator ZC_CMP1 compares the first voltage $V_{AC1}$ at the AC1_DET terminal with the first threshold voltage $V_{ZC1}$. When the first voltage $V_{AC1}$ is higher than the first threshold voltage $V_{ZC1}$, the output ZC_DET1 of the first zero current detection comparator ZC_CMP1 is set to a first level (high level in the present embodiment). When the first voltage $V_{AC1}$ is lower than the first threshold voltage $V_{ZC1}$, the output ZC_DET1 is set to a second level (low level in the present embodiment).

The first zero current detection comparator ZC_CMP1 is configured as a hysteresis comparator. When $V_{AC1}<V_{ZC1}$, the threshold voltage $V_{ZC1}$ is set to a higher value. When $V_{AC1}>V_{ZC1}$, the threshold voltage $V_{ZC1}$ is set to a lower value (which will be represented by $V_{ZC3}$ for convenience).

Description will be made later regarding the first adjustment comparator ADJ_CMP1 and the first adjustment unit 210.

The second zero current detection circuit 206 has the same configuration as that of the first zero current detection circuit 204. Specifically, the second zero current detection circuit 206 includes a second variable voltage source VS2, a second zero current detection comparator ZC_CMP2, a second adjustment comparator ADJ_CMP2, and a second adjustment unit 212.

The second zero current detection comparator ZC_CMP2 compares the second voltage $V_{AC2}$ at the AC2_DET terminal with the second threshold voltage $V_{ZC2}$. The second zero current detection comparator ZC_CMP2 outputs a ZC_DET2 signal having a first level (high level) when $V_{AC2}>V_{ZC2}$, and having a second level (low level) when $V_{AC2}<V_{ZC2}$. The second zero current detection comparator ZC_CMP2 is configured as a hysteresis comparator. When $V_{AC2}<V_{ZC2}$, the threshold voltage $V_{ZC2}$ is set to a higher voltage. Conversely, when $V_{AC2}>V_{ZC2}$, the threshold voltage $V_{ZC2}$ is set to a lower voltage (which will be referred to as "$V_{ZC4}$" for convenience).

The control logic 202 performs the following control operation.

(1) When the ZC_DET1 signal is switched to the first level (high level), the control logic 202 switches the bridge circuit 102 from the first state φ1 to the second state φ2.

(2) When the ZC_DET2 signal is switched to the second level (low level), the control logic 202 switches the bridge circuit 102 from the second state φ2 to the third state φ3.

(3) When the ZC_DET2 signal is switched to the first level (high level), the control logic 202 switches the bridge circuit 102 from the third state φ3 to the fourth state φ4.

(4) When the ZC_DET1 signal is switched to the second level (low level), the control logic 202 switches the bridge circuit 102 from the fourth state φ4 to the first state φ1.

The control logic 202 may be configured as a state machine. The control logic 202 generates gate signals G1 through G4 to be used to switch on and off the first transistor M1 through the fourth transistor M4, respectively. The driver 208 switches on and off the first transistor M1 through the fourth transistor M4 according to the gate signals G1 through G4, respectively.

Figure 4:
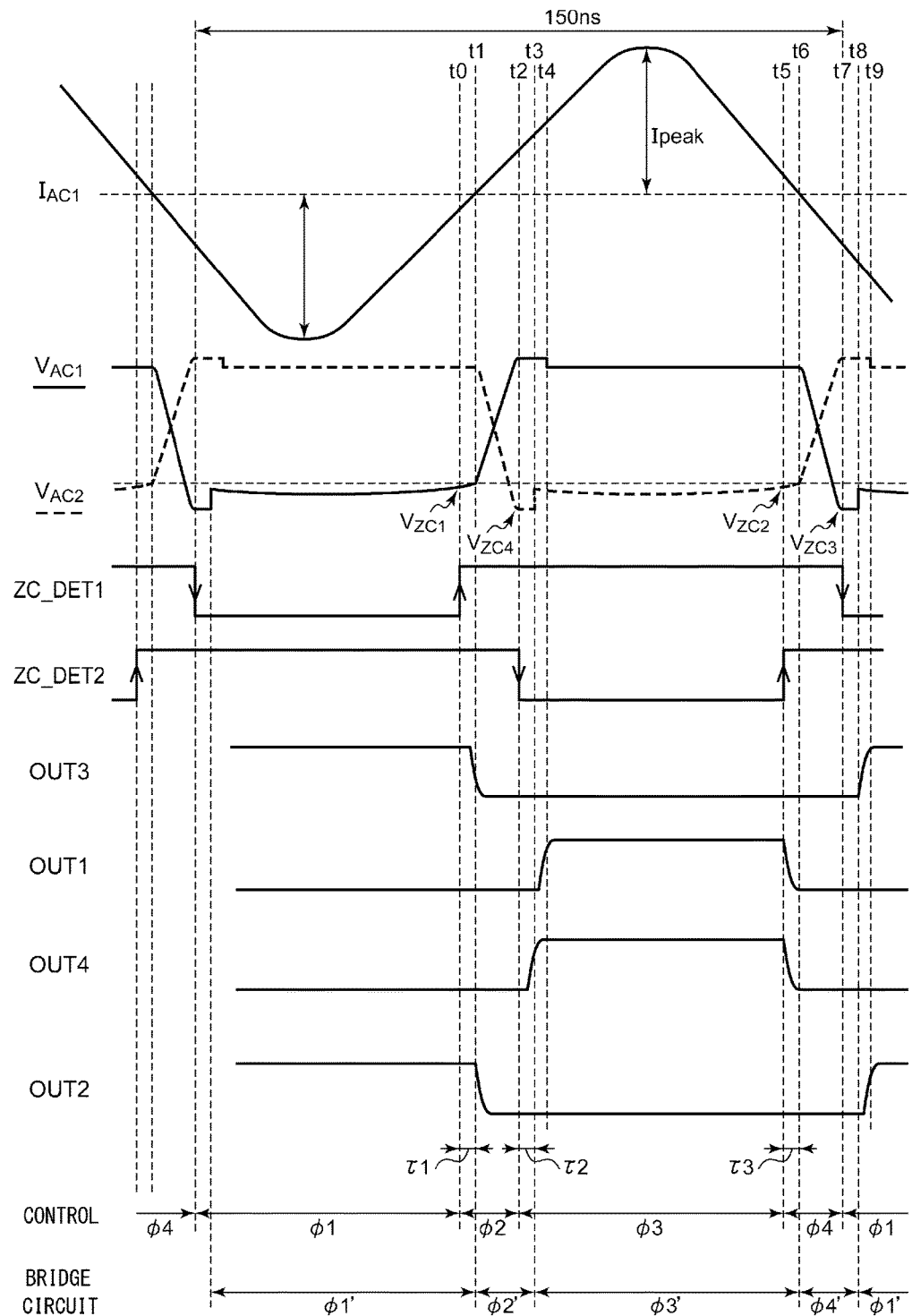
FIG. 4 is a waveform diagram showing a basic operation of the synchronous rectifier circuit.

The above is the basic configuration of the synchronous rectifier circuit 100. Next, description will be made regarding the rectification operation of the synchronous rectifier circuit 100. FIG. 4 is a waveform diagram showing a basic operation of the synchronous rectifier circuit 100.

Before the time point t0, the state is set to the first state φ1. When the first voltage $V_{AC1}$ at the first detection terminal AC1_DET exceeds the first threshold voltage $V_{ZC1}$, the ZC_DET1 signal is set to the first level (high level). In this stage, the control circuit 200 transmits an instruction to switch the state to the second state φ2. Subsequently, at the time point t1 after a detection delay τ1 elapses, the outputs OUT2 and OUT3 are each set to the low level, which turns off the second transistor M2 and the third transistor M3.

When the second voltage $V_{AC2}$ at the second detection terminal AC2_DET becomes lower than the threshold voltage $V_{ZC4}$, the ZC_DET2 signal is switched to the second level (low level). In this stage, the control circuit 200 transmits an instruction to switch the state to the third state φ3. Subsequently, at the time point t3 after a detection delay τ2 elapses, the fourth transistor M4 is turned on. Subsequently, at the time point t4, the first transistor M1 is turned on.

When the second voltage $V_{AC2}$ at the second detection terminal AC2_DET exceeds the second threshold voltage $V_{ZC2}$, the ZC_DET2 signal is switched to the first level (high level). In this stage, the control circuit 200 transmits an instruction to switch the state to the fourth state φ4. Subsequently, at the time point t6 after a detection delay τ3 elapses, the outputs OUT1 and OUT4 are each set to the low level, which turns off the first transistor M1 and the fourth transistor M4.

When the first voltage $V_{AC1}$ at the first detection terminal AC1_DET becomes lower than the threshold voltage $V_{ZC3}$, the ZC_DET1 signal is switched to the second level (low level). In this stage, the control circuit 200 transmits an instruction to switch the state to the first state φ1. Subsequently, at the time point t8 after a detection delay τ4 elapses, the third transistor M3 is turned on. Subsequently, at the time point t9, the second transistor M2 is turned on.

The synchronous rectifier circuit 100 repeatedly performs the aforementioned operation. Next, description will be made regarding a problem involved in the synchronous rectifier circuit 100.

The states φ1' through φ4' of the bridge circuit 102 each transit with a delay from the transition of the corresponding state of the control circuit 200, i.e., a corresponding one of the states φ1 through φ4. The first threshold voltage $V_{ZC1}$ through the fourth threshold voltage $V_{ZC4}$, which are to be set for the control circuit 200, are determined such that the states φ1' through φ4' of the bridge circuit 102 match the actual zero-crossing points in the currents $I_{AC1}$ and $I_{AC2}$.

Description will be made below directing attention to the transition from the first state φ1 to the second state φ2. In the first state φ1, the first voltage $V_{AC1}$ is represented by $I_{AC1} \times R_{ON3}$. Here, $R_{ON3}$ represents the on resistance of the third transistor M3. The threshold voltage $V_{ZC1}$ may be determined such that the actual zero-current point ($I_{AC1}$=0) occurs after the passage of the delay time τ1 after the first voltage $V_{AC1}$ crosses the threshold voltage $V_{ZC1}$.

With the slope of the current $I_{AC1}$ as α (A/s), the slope of the first voltage $V_{AC1}$ is represented by $\alpha \times R_{ON3}$ (V/s). Accordingly, by determining the threshold voltage $V_{ZC1}$ so as to satisfy the following Expression (1), such an arrangement provides ideal zero-current switching.

$$V_{ZC1} = \alpha \times R_{ON3} \times \tau 1 \quad (1)$$

However, the delay τ1 can vary due to variation in the offset voltage of the first zero current detection comparator ZC_CMP1, variation in the response speed of each comparator, variation in the delay of the control logic 202, variation in the delay of the driver 208, and the like.

Furthermore, variation also occurs in the on resistance $R_{ON3}$ of the third transistor M3. In a case in which the third transistor M3 is configured as an external discrete component, there is marked variation in the on resistance $R_{ON3}$. Furthermore, the slope α changes due to a change in the frequency of the current $I_{AC}$ or a change in the peak value $I_{PEAK}$ of the current $I_{AC}$.

Accordingly, in a case in which the first threshold voltage $V_{ZC1}$ is configured as a fixed value, the switching operation deviates from ideal zero-current switching due to such variation, measurement error, a change in the current, or the like. The same can be said of the transition from the third state φ3 to the fourth state φ4. Specifically, in a case in which the second threshold voltage $V_{ZC2}$ is configured as a fixed voltage, the switching operation deviates from ideal zero-current switching. It should be noted that the problem described above has been uniquely studied by the present inventors, and is by no means within the scope of common and general knowledge of those skilled in this art.

In order to solve this problem, the control circuit 200 shown in FIG. 3 further includes a first adjustment unit 210, a first adjustment comparator ADJ_CMP1, a second adjustment unit 212, and a second adjustment comparator ADJ_CMP2.

The first adjustment comparator ADJ_CMP1 compares the first voltage $V_{AC1}$ with a predetermined first reference voltage $V_{TH1}$ configured as a negative voltage. With the forward voltage of each diode as Vf, the first reference voltage $V_{TH1}$ is set to a value that is lower than the ground voltage, i.e., 0 V, and that is higher than −Vf. Typically, each diode has a forward voltage Vf of 0.6 to 0.7 V. For example, the first reference voltage $V_{TH1}$ can be set to a value on the order of −50 to −300 mV. In the present embodiment, the first reference voltage $V_{TH1}$ is set to −120 mV. When $V_{AC1} < V_{TH1}$, the output VF_DET1 of the first adjustment comparator ADJ_CMP1 is set to a first level (e.g., high level). When $V_{AC1} > V_{TH1}$, the output VF_DET1 is set to a second level (e.g., low level).

The first adjustment unit 210 adjusts the first threshold voltage $V_{ZC1}$ generated by the first variable voltage source VS1, according to the output VF_DET1 of the first adjustment comparator ADJ_CMP1.

The same operation is performed on the second zero current detection circuit 206 side. The second adjustment comparator ADJ_CMP2 compares the second voltage $V_{AC2}$ with a predetermined second reference voltage $V_{TH2}$ configured as a negative voltage. The second reference voltage $V_{TH2}$ may be set to the same voltage as the first reference voltage $V_{TH1}$.

When $V_{AC2} < V_{TH2}$, the output VF_DET2 of the second adjustment comparator ADJ_CMP2 is set to a first level (e.g., high level). When $V_{AC2} > V_{TH2}$, the output VF_DET2 is set to a second level (e.g., low level).

The second adjustment unit 212 adjusts the second threshold voltage $V_{ZC2}$ generated by the second variable voltage source VS2, according to the output VF_DET2 of the second adjustment comparator ADJ_CMP2.

The above is the configuration of the control circuit 200. Next, description will be made regarding the optimization of the first threshold voltage $V_{ZC1}$ and the second threshold voltage $V_{ZC2}$.

FIGS. 5A through 5D are operation waveform diagrams each showing the operation of the synchronous rectifier circuit 100 shown in FIG. 3. Description will be made directing attention to the transition from the first state φ1 to the second state φ2. FIG. 5A shows the current $I_{AC1}$. FIGS. 5B through 5D each show the first voltage $V_{AC1}$, the ZC_DET1 signal, and the output VF_DET1 of the first adjustment comparator ADJ_CMP1. There is a difference in the first threshold voltage $V_{ZC1}$ among the operations shown in FIGS. 5B through 5D.

FIG. 5C shows ideal zero-current switching. In the switching operation shown in FIG. 5B, the first threshold voltage $V_{ZC1}$ is set to a voltage that is higher than that shown in FIG. 5C. Accordingly, such a switching operation leads to a problem of power loss in the hatched area.

In FIG. 5D, the first threshold voltage $V_{ZC1}$ is set to a voltage that is lower than that shown in FIG. 5C. In this case, the state transits to the second state φ2 before the current zero-crossing timing ZC, which turns off the third transistor M3. In this case, the current $I_{AC1}$ flows through the diode D3 which is in parallel with the third transistor M3, which sets the first voltage $V_{AC1}$ to −Vf. In this stage, the first adjustment comparator ADJ_CMP1 detects that the first voltage $V_{AC1}$ has become −Vf, and asserts the VF_DET1 signal.

In a case in which the threshold voltage $V_{ZC1}$ is equal to or otherwise higher than an ideal value for the zero-current switching, the current $I_{AC1}$ does not flow through the diode D3. In this state, the VF_DET1 signal is not asserted. Conversely, in a case in which the threshold voltage $V_{ZC1}$ is lower than the ideal value, the current $I_{AC}$ flows through the diode D3 even if there is a very small difference between them. In this state, the VF_DET1 signal is asserted.

In other words, the ideal value of the first threshold voltage $V_{ZC1}$ is is the lowest possible value of the voltage that is set immediately before the VF_DET1 signal is asserted. Thus, by monitoring the VF_DET1 signal while changing the first threshold voltage $V_{ZC1}$, such an arrangement allows the first adjustment unit 210 to detect the ideal value of the first threshold voltage $V_{ZC1}$.

For example, the first adjustment unit 210 reduces the first threshold voltage $V_{ZC1}$ in a stepwise manner until the VF_DET1 signal is asserted. With such an arrangement, the ideal value may be set to a value of the first threshold voltage $V_{ZC1}$ immediately before the VF_DET1 signal is asserted.

As described above, with the synchronous rectifier circuit 100 according to the embodiment, the threshold voltages $V_{ZC1}$ and $V_{ZC2}$ can be adjusted to respective voltage levels that provide ideal zero-current switching even if there is variation in the circuit constants, or variation in the frequency, peak value, or slope of the current. By providing ideal zero-current switching, such an arrangement is capable of reducing the power loss across each switching element (transistor), thereby providing improved efficiency. Furthermore, by providing reduced power loss, such an arrangement is capable of suppressing heat generation. This allows the thermal design to be performed in a simple manner for the synchronous rectifier circuit 100 itself or otherwise for a device employing the synchronous rectifier circuit 100.

With conventional techniques, in order to suppress variation in the on resistances of the third transistor M3 and the fourth transistor M4, there is a need to build the bridge circuit 102 into the control circuit 200. Otherwise, as the third transistor M3 and the fourth transistor M4, there is a need to select and employ an element that has an on resistance having little variation. In contrast, with the control circuit 200 according to the embodiment, by adjusting the threshold voltages $V_{ZC1}$ and $V_{ZC2}$, such an arrangement is capable of absorbing such variation in the on resistances $R_{ON}$. Such an arrangement allows the bridge circuit 102 to be configured as an external discrete component. Thus, by means of the operation of the control circuit 200, such an arrangement provides reduced on resistances, thereby further providing improved efficiency.

Furthermore, with conventional techniques, in order to reduce the delay τ as much as possible, there is a need to employ a high-speed comparator as the first zero current detection comparator ZC_CMP1 and the second zero current detection comparator ZC_CMP2. However, such a high-speed comparator requires a large circuit area and large power consumption. In contrast, with the embodiment, by adjusting the threshold voltages $V_{ZC1}$ and $V_{ZC2}$, such an arrangement is capable of absorbing the delay τ itself and variation in the delay τ even if the delay τ itself is large or even if there is variation in the delay τ. Thus, such an arrangement allows the comparators ZC_CMP1 and ZC_CMP2 to each be configured as a low-speed comparator. This allows the circuit design to be performed in a simple manner.

With conventional techniques, as the switching period of the synchronous rectifier circuit becomes shorter, i.e., as the switching frequency becomes higher, the effects of such multiple kinds of variation become larger. Thus, it is difficult for such a conventional technique to support high-frequency switching, which is a problem. In contrast, with the embodiment, such an arrangement is capable of supporting a switching operation with the AC signal $I_{AC}$ having a high frequency.

It should be noted that the adjustment of the threshold voltages $V_{ZC1}$ and $V_{ZC2}$ may be performed at all times in the operation of the synchronous rectifier circuit 100. This allows the threshold voltages $V_{ZC1}$ and $V_{ZC2}$ to be adjusted according to the change in the characteristics of the AC current $I_{AC}$ and the change in the delay τ even if a change occurs in the characteristics of the AC current $I_{AC}$ or in the delay τ.

Conversely, the adjustment of the threshold voltages $V_{ZC1}$ and $V_{ZC2}$ may be performed only in a calibration period set during or otherwise before the operation of the synchronous rectifier circuit 100. That is to say, if there is only a negligible change in the characteristics of the AC current IAC or in the delay τ, once the optimized voltage is determined, the optimized voltage thus determined may be repeatedly used. Such a calibration operation may be performed in a periodical manner.

This provides reduced power consumption in the first adjustment comparator ADJ_CMP1, the second adjustment comparator ADJ_CMP2, the first adjustment unit 210, and the second adjustment unit 212.

The present invention encompasses various kinds of circuits that can be regarded as a block configuration or a circuit configuration shown in FIG. 3, or otherwise that can be derived from the aforementioned description. That is to say, the present invention is not restricted to a specific circuit configuration. Specific description will be made below for clarification and ease of understanding of the essence of the present invention and the circuit operation. That is to say, the following description will by no means be intended to restrict the technical scope of the present invention.

Figure 6:
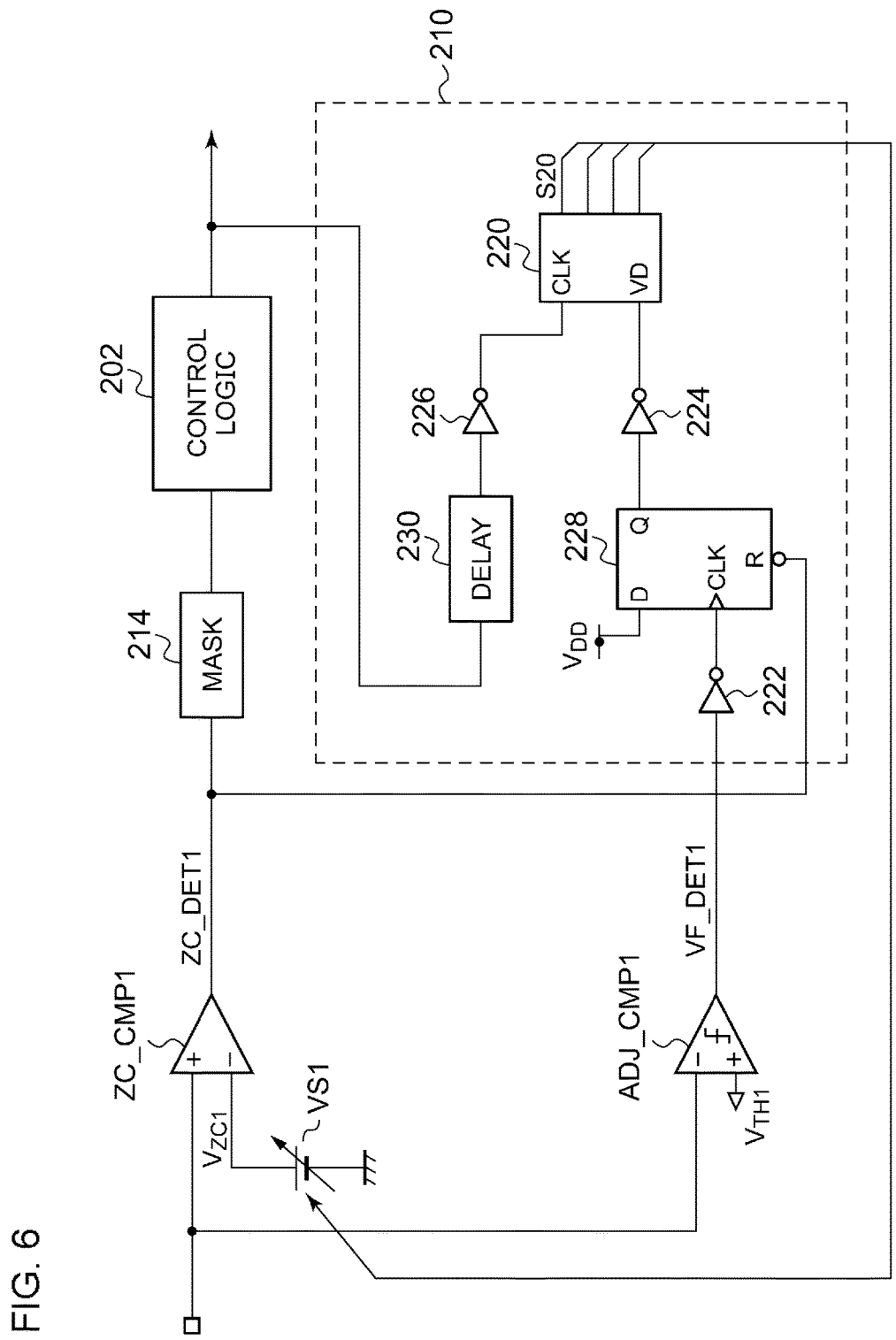
FIG. 6 is a circuit diagram showing an example configuration of a first adjustment unit.

FIG. 6 is a circuit diagram showing an example configuration of the first adjustment unit 210. A mask circuit 214 masks the change in the level of the ZC_DET1 signal, thereby removing the effects of noise.

The first adjustment unit 210 includes an up/down counter 220. The count value S20 of the up/down counter 220 is used as a control signal for controlling the first variable voltage source VS1. In this description, the threshold voltage $V_{ZC1}$ is raised according to an increase in the count value S20.

The up/down counter 220 counts up during a period in which the VF_DET1 signal is set to the low level, i.e., during a period in which $V_{AC1} > V_{TH1}$. Conversely, the up/down counter 220 counts down during a period in which the VF_DET1 signal is set to the high level, i.e., during a period in which $V_{AC1} < V_{TH1}$.

Inverters 222, 224, and 226, a flip-flop 228, and a delay circuit 230, are arranged in order to provide timing adjustment and to provide logic level matching. The flip-flop 228 is arranged such that its input terminal (D) receives a high level voltage (i.e., power supply voltage $V_{DD}$), and such that its clock terminal receives the VF_DET1 signal inverted by the inverter 222. Furthermore, the ZC_DET1 signal is input to the reset terminal (logical inversion) of the flip-flop 228. The second adjustment unit 212 is configured in the same manner as in the first adjustment unit 210.

Figure 7:
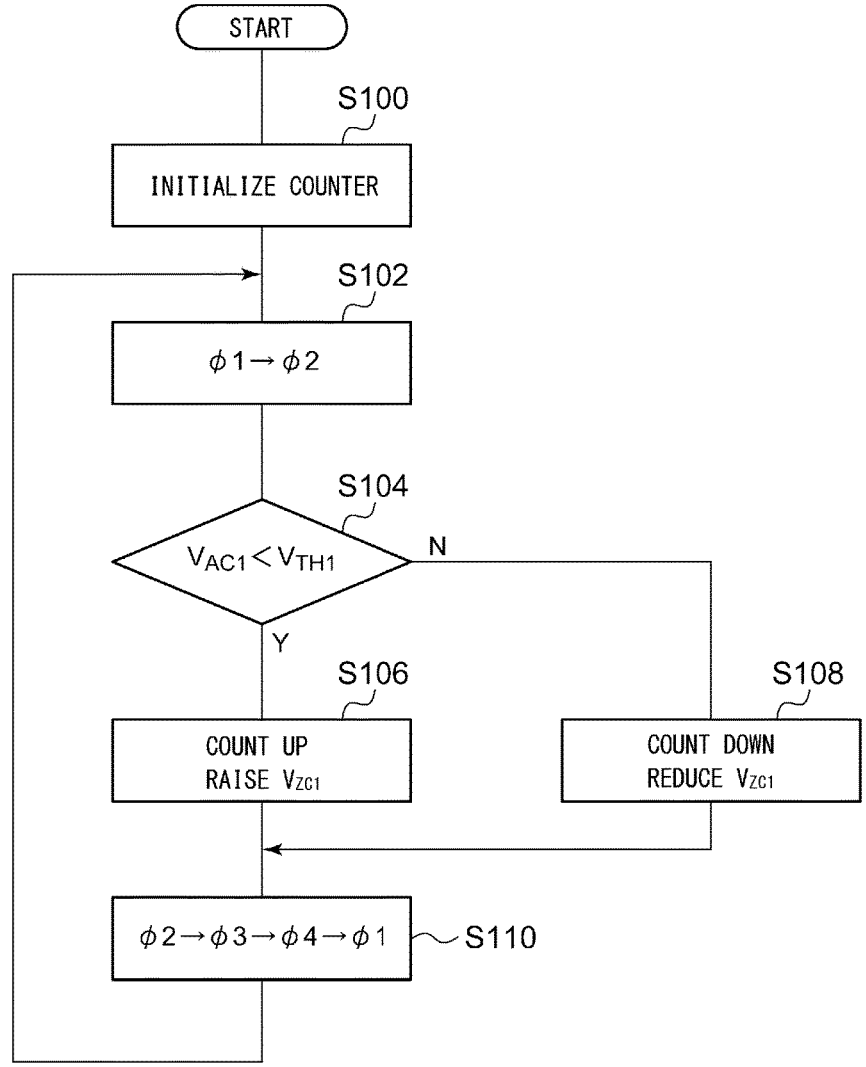
FIG. 7 is a flowchart showing the operation of the first adjustment unit shown in FIG. 6.

Next, description will be made regarding the operation of the first adjustment unit 210. FIG. 7 is a flowchart showing the operation of the first adjustment unit 210 shown in FIG. 6.

First, the up/down counter 220 is initialized (S100). The initial value of the count value S20 is determined such that the threshold voltage $V_{ZC1}$ is higher than its ideal value. For example, the count value may be set to the maximum value of the counter. Also, the count value may be set to a value such that the threshold voltage $V_{ZC1}$ becomes 0 V.

It should be noted that, in a case in which the initial value of the threshold voltage $V_{ZC1}$ is set such that it is lower than its ideal value, this can become a cause of a malfunction. Conversely, in a case in which the initial value is set to a high value, such an arrangement requires an increased time period to acquire the ideal value, but such an arrangement is capable of preventing a malfunction.

The state transits from the first state φ1 to the second state φ2 (S102). In this stage, when $V_{AC1} > V_{TH1}$ (NO in S104), judgment is made that the threshold voltage $V_{ZC1}$ is higher than its ideal value. In this case, the up/down counter 220 counts down (S108), which lowers the threshold voltage $V_{ZC1}$. Conversely, when $V_{AC1} < V_{TH1}$ (YES in S104), judgment is made that the threshold voltage $V_{ZC1}$ is lower than its ideal value. In this case, the up/down counter 220 counts up (S106), which raises the threshold voltage $V_{ZC1}$.

Subsequently, the state sequentially transits in the order of the second state φ2, the third state φ3, the fourth state φ4, and the first state φ1 (S110). Next, the flow returns to Step S102.

This operation is repeatedly performed. As a result, the first threshold voltage $V_{ZC1}$ settles in the vicinity of its ideal value. The same processing is performed in parallel on the AC2 side. As a result, the second threshold voltage $V_{ZC2}$ settles in the vicinity of its ideal value in the same manner.

Description has been made above regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

[First Modification]

Figure 8:
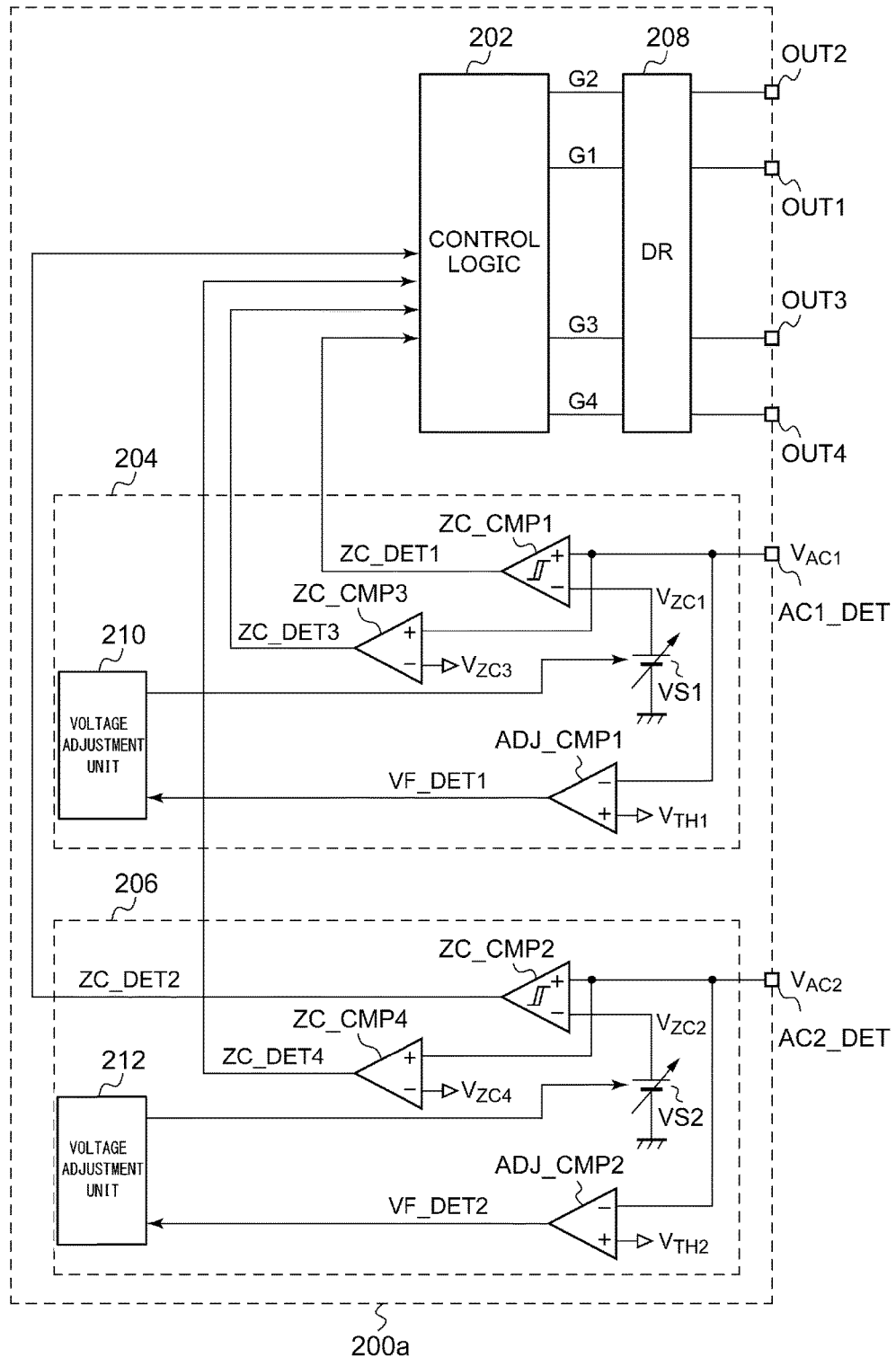
FIG. 8 is a block diagram showing a control circuit according to a first modification.

FIG. 8 is a block diagram showing a control circuit 200*a* according to a first modification. In this modification, the control circuit 200*a* further includes a third zero current detection comparator ZC_CMP3 and a fourth zero current detection comparator ZC_CMP4.

The third zero current detection comparator ZC_CMP3 compares a first voltage $V_{AC1}$ with a third threshold voltage $V_{ZC3}$, and generates a third detection signal (ZC_DET3) that indicates a comparison result. When $V_{AC1} > V_{ZC3}$, the ZC_DET3 signal is set to a first level (e.g., high level). Conversely, when $V_{AC1} < V_{ZC3}$, the ZC_DET3 signal is set to a second level (low level).

On the other hand, the fourth zero current detection comparator ZC_CMP4 compares a second voltage $V_{AC2}$ with a fourth threshold voltage $V_{ZC4}$, and generates a fourth detection signal (ZC_DET4) that indicates a comparison result. When $V_{AC2} > V_{ZC4}$, the ZC_DET4 signal is set to a first level (e.g., high level). Conversely, when $V_{AC2} < V_{ZC4}$, the ZC_DET4 signal is set to a second level (e.g., low level).

When the ZC_DET4 signal transits to the second level (low level), the control logic 202 switches the bridge circuit 102 from the second state φ2 to the third state φ3, and when the ZC_DET3 signal transits to the second level (low level), the control logic 202 switches the bridge circuit 102 from the fourth state φ4 to the first state φ1.

Such a modification allows the threshold voltages $V_{ZC3}$ and $V_{ZC4}$ to be determined independently of adjustment of the first threshold voltage $V_{ZC1}$ and the second threshold voltage $V_{ZC2}$.

[Second Modification]

Description has been made in the embodiment regarding an arrangement in which both the AC1 side and the AC2 side are provided with the threshold voltage adjustment units for the threshold voltage $V_{ZC1}$ and for the threshold voltage $V_{ZC2}$, respectively. Also, such a threshold voltage adjustment unit may be provided to only one from among the AC1 side or the AC2 side. For example, such a threshold voltage adjustment unit may be provided to only the AC1 side. As an example, the AC1 side and the AC2 side may share the first adjustment comparator ADJ_CMP1 and the first adjustment unit 210 in a time sharing manner so as to adjust the threshold voltages.

Such a modification allows the circuit area to be reduced.

Alternatively, the second threshold voltage $V_{ZC2}$ may be adjusted based on the result of adjustment of the first threshold voltage $V_{ZC1}$ provided by the first adjustment unit 210.

In a case in which there is high symmetry between the AC1 side and the AC2 side, such threshold monitoring adjustment may be performed on only one side from among the AC1 side and the AC2 side, and the threshold voltage to be set for the other side may be optimized based on the threshold monitoring adjustment result thus obtained, thereby providing optimization processing for both the first threshold voltage $V_{ZC1}$ and the second threshold voltage $V_{ZC2}$. Such an arrangement allows the circuit area to be reduced

[Third Modification]

Description has been made in the embodiment regarding an arrangement in which the first voltage $V_{AC1}$ and the second voltage $V_{AC2}$ are compared with at least a corresponding one from among the threshold voltages $V_{ZC1}$ through $V_{ZC4}$, each set to a voltage in the vicinity of 0 V, so as to detect the zero-current point. However, the present invention is not restricted to such an arrangement. Also, the threshold voltages $V_{ZC1}$ through $V_{ZC4}$ may each be set to a voltage in the vicinity of the rectified voltage $V_{RECT}$.

Such a modification includes the control circuit 200 having the same configuration as that shown in FIG. 3. The first threshold voltage $V_{ZC1}$ and the second threshold voltage $V_{ZC2}$ may each be variable in the vicinity of the rectified voltage $V_{RECT}$. The first reference voltage $V_{TH1}$ and the second reference voltage $V_{TH2}$ are each configured as a positive voltage that is higher than the rectified voltage $V_{RECT}$ and that is lower than $(V_{RECT} + Vf)$.

Figure 9:
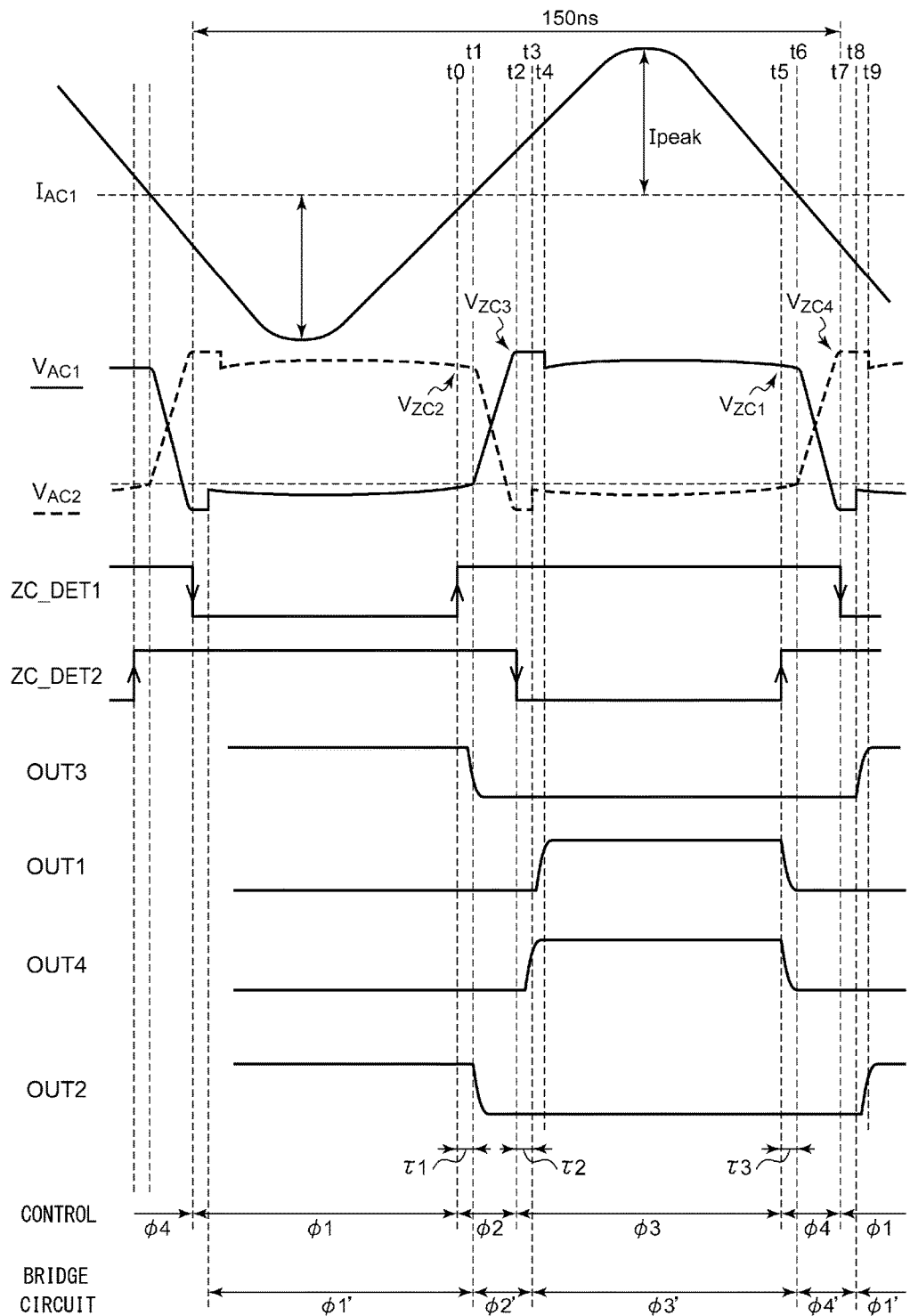
FIG. 9 is an operation waveform diagram showing the operation of a synchronous rectifier circuit according to a third modification.

FIG. 9 is an operation waveform diagram showing the operation of the synchronous rectifier circuit 100 according to a third modification.

The control logic 202 performs the following operations.

(i) When the ZC_DET1 signal becomes the second level (e.g., high level), i.e., when $V_{AC1} < V_{TH1}$, the control logic 202 instructs the bridge circuit 102 to transit from the third state φ3 to the fourth state φ4.

(ii) When the ZC_DET2 signal becomes the second level (e.g., high level), i.e., when $V_{AC2} < V_{TH2}$, the control logic 202 instructs the bridge circuit 102 to transit from the first state φ1 to the second state φ2.

(iii) When the ZC_DET1 signal becomes the first level (e.g., low level), i.e., when $V_{AC1} > V_{TH3}$, the control logic 202 instructs the bridge circuit 102 to transit from the second state φ2 to the third state φ3.

(iv) When the ZC_DET2 signal becomes the first level (e.g., low level), i.e., when $V_{AC2} > V_{TH4}$, the control logic 202 instructs the bridge circuit 102 to transit from the fourth state φ4 to the first state φ1.

Description will be made directing attention to the transition from the third state φ3 to the fourth state φ4. The first voltage $V_{AC1}$ in the third state φ3 is represented by the following Expression (2).

$$V_{AC1} = I_{AC1} \times R_{ON3} + V_{RECT} \quad (2)$$

As the current $I_{AC1}$ approaches zero, $V_{AC1}$ decreases toward $V_{RECT}$ with the passage of time. With such a modification, as the first threshold voltage $V_{ZC1}$ becomes higher, the zero-current point detection time point the zero-current point detection time point becomes earlier. For example, the first adjustment unit 210 may raise the first threshold voltage $V_{ZC1}$ from an initial value in a stepwise manner, so as to detect its ideal value. The same operations are performed on the second adjustment unit 212 side.

The first or second modification may be applied to the third modification.

[Fourth Modification]

In the modification shown in FIG. 8, the threshold voltages $V_{ZC1}$ and $V_{ZC2}$ may each be set to a voltage in the vicinity of 0 V, and the threshold voltages $V_{ZC3}$ and $V_{ZC4}$ may each be set to a voltage in the vicinity of the rectified voltage $V_{RECT}$. Conversely, the threshold voltages $V_{ZC1}$ and $V_{ZC2}$ may each be set to a voltage in the vicinity of the rectified voltage $V_{RECT}$, and the threshold voltages $V_{ZC3}$ and $V_{ZC4}$ may each be set to a voltage in the vicinity of 0 V.

[Fifth Modification]

It should be noted that the assignment of the high level and the low level of each signal is shown for exemplary purposes only in the description in the embodiment, and is no more than a matter of design choice, which can be readily conceived by those skilled in this art.

[Usage]

Figure 10:
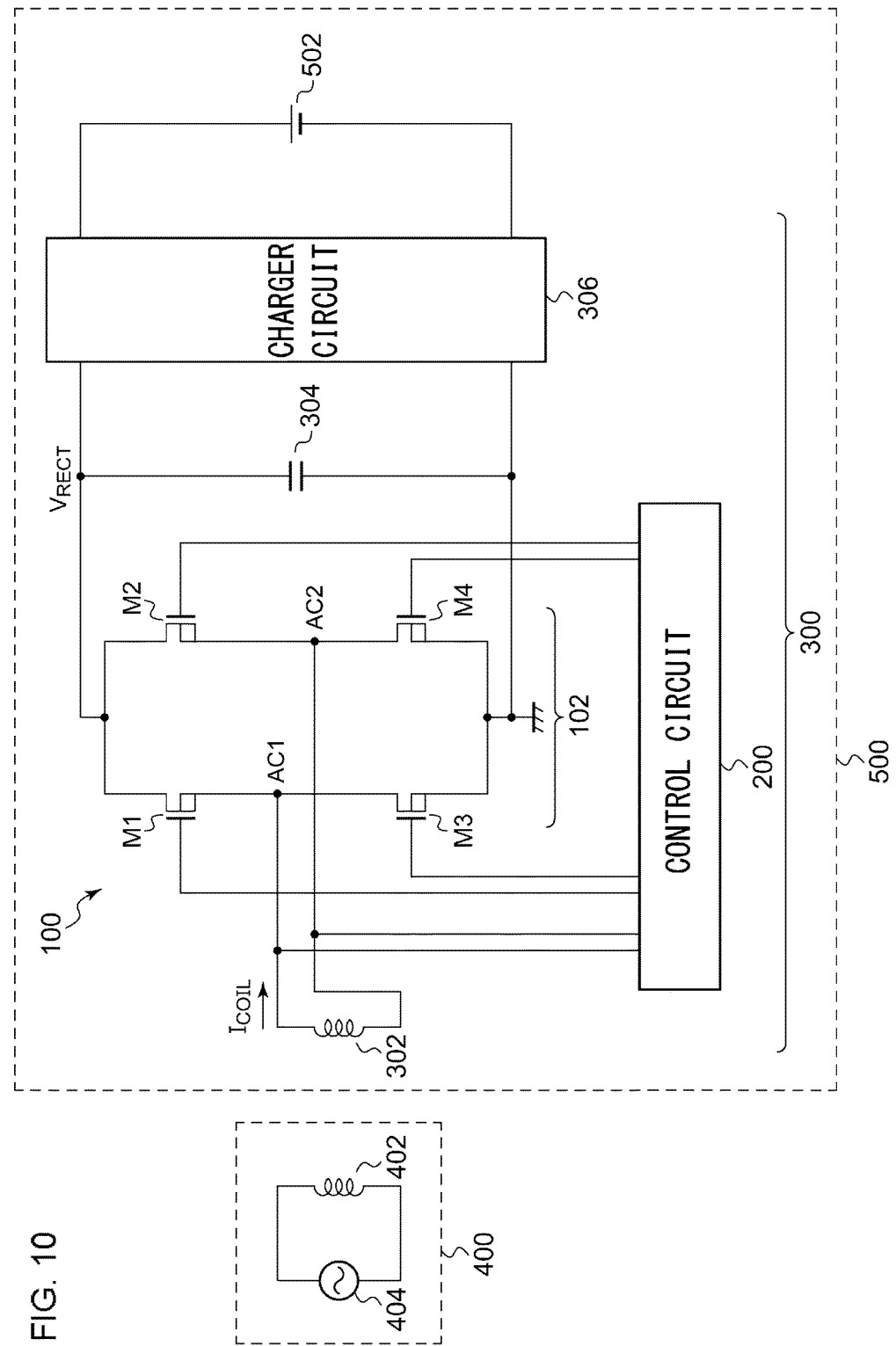
FIG. 10 is a block diagram showing a wireless power receiving apparatus including a synchronous rectifier circuit.

Next, description will be made regarding a preferred usage of the synchronous rectifier circuit 100. The synchronous rectifier circuit 100 is preferably applicable to a power receiving apparatus of a wireless power supply system. FIG. 10 is a block diagram showing a wireless power receiving apparatus 300 including the synchronous rectifier circuit 100.

The wireless power receiving apparatus 300 is mounted on an electronic device 500. The electronic device 500 is configured as a device that is chargeable using contactless power transmission (which is also referred to as "contactless power transmission" or "wireless power supply"), examples of which include an electric shaver, an electric toothbrush, a cordless phone, a game machine controller, an electric power tool, and the like. Alternatively, the electronic device 500 may be configured as a cellular phone terminal, a tablet PC, a laptop PC, a digital still camera, a digital video camera, a portable audio device, a portable game machine, or the like.

The electronic device 500 includes a secondary battery 502 and the wireless power receiving apparatus 300. The wireless power receiving apparatus 300 receives electric power from a wireless power supply apparatus 400, and charges the secondary battery 502. For example, the secondary battery 502 is configured as a nickel hydride battery or a lithium-ion battery.

The wireless power supply apparatus 400 supplies an electric power signal to the wireless power receiving apparatus 300. The wireless power supply apparatus 400 includes a transmission coil 402 and a driver unit 404. The driver unit 404 is configured as a voltage source or otherwise a current source, which applies an AC driving current to the transmission coil 402.

A receiving coil 302 included in the wireless power receiving apparatus 300 is located in the vicinity of the transmission coil 402 such that they are coupled with each other. When a driving current flows through the transmission coil 402, a coil current $I_{COIL}$ flows through the reception coil 302 by means of an electromagnetic induction mechanism.

In addition to the reception coil 302, the wireless power receiving apparatus 300 includes the synchronous rectifier circuit 100, a smoothing capacitor 304, and a charger circuit 306.

The synchronous rectifier circuit 100 rectifies the coil current $I_{COIL}$ that flows through the reception coil 302, and supplies the coil current $I_{COIL}$ thus rectified to the smoothing capacitor 304. The charger circuit 306 receives the rectified voltage $V_{RECT}$, and charges the secondary battery 502.

The synchronous rectifier circuit 100 according to the embodiment is preferably employed as a rectifier circuit included in a wireless power supply that supplies an electric power signal having a frequency that is higher than that of commercial AC electric power. It should be noted that the usage of the synchronous rectifier circuit 100 is not restricted to such an arrangement. Rather, the synchronous rectifier circuit 100 can be employed in various kinds of applications such as an AC/DC converter, etc.

While the preferred embodiments of the present invention have been described using specific terms, such description is for illustrative purposes only, and it is to be understood that changes and variations may be made without departing from the spirit or scope of the appended claims.

What is claimed is:

1. A control circuit structured to form a synchronous rectifier circuit together with a bridge circuit, wherein the bridge circuit comprises:

a first transistor arranged between a first input node and a rectification node;

a second transistor arranged between a second input node and the rectification node;

a third transistor arranged between the first input node and a reference node; and a fourth transistor arranged between the second input node and the reference node, and wherein the control circuit comprises:

a first variable voltage source structured to generate a first threshold voltage which is variable;

a first zero current detection comparator structured to compare a first voltage at the first input node with the first threshold voltage, and to generate a first detection signal having a first level when the first voltage is higher than the first threshold voltage, and having a second level when the first voltage is lower than the first threshold voltage;

a first adjustment comparator structured to compare the first voltage with a first reference voltage;

a first adjustment unit structured to adjust the first threshold voltage generated by the first variable voltage source, based on an output of the first adjustment comparator; and a control logic structured to switch a state of the bridge circuit according to the first detection signal, and wherein the first adjustment unit comprises an up/down counter structured to select one from among a count up operation and a count down operation, according to an output of the first adjustment comparator, and wherein the first adjustment voltage is set according to a count value of the up/down counter, and wherein the first threshold voltage is variable in the vicinity of zero, wherein the first reference voltage is configured as a negative voltage, wherein the control logic is structured to instruct the bridge circuit to transit from a first state to a second state when the first detection signal becomes the first level, wherein a pair of the first transistor and the fourth transistor are turned off and a pair of the second transistor and the third transistor are turned on in the first state, and the first transistor through the fourth transistor are turned off in second state.

2. The control circuit according to claim 1, wherein, with a forward voltage of a diode as Vf, the first reference voltage is set to be higher than −Vf.

3. The control circuit according to claim 1, further comprising a second zero current detection comparator that compares a second voltage at the second input node with a second threshold voltage, and that generates a second detection signal having a first level when the second voltage is higher than the second threshold voltage, and having a second level when the second voltage is lower than the second threshold voltage, wherein, when the second detection signal becomes the first level, the control logic instructs the bridge circuit to transit from a third state in which a pair of the second transistor and the third transistor are turned off and a pair of the first transistor and the fourth transistor are turned on, to a fourth state in which the first transistor through the fourth transistor are turned off.

4. The control circuit according to claim 3, further comprising:

a second variable voltage source that generates the second threshold voltage which is variable;

a second adjustment comparator that compares the second voltage with a second reference voltage configured as a negative voltage; and a second adjustment unit that adjusts the second threshold voltage generated by the second variable voltage source, based on an output of the second adjustment comparator.

5. The control circuit according to claim 3, wherein, when the second detection signal becomes the second level, the control logic instructs the bridge circuit to transit from the second state to the third state, and wherein, when the first detection signal becomes the second level, the control logic instructs the bridge circuit to transit from the fourth state to the first state.

6. The control circuit according to claim 5, wherein the first zero current detection comparator and the second zero current detection comparator are each configured as a hysteresis comparator.

7. The control circuit according to claim 3, further comprising:

a third zero current detection comparator that compares the first voltage with a third threshold voltage, and that generates a third detection signal which indicates a comparison result; and a fourth zero current detection comparator that compares the second voltage with a fourth threshold voltage, and that generates a fourth detection signal which indicates a comparison result, wherein the control logic instructs the bridge circuit to transit from the second state to the third state according to one from among the third detection signal and the fourth detection signal, and wherein the control logic instructs the bridge circuit to transit from the fourth state to the first state according to the other signal from among the third detection signal and the fourth detection signal.

8. The control circuit according to claim 1, integrated on a single semiconductor substrate.

9. A synchronous rectifier circuit comprising:

a bridge circuit; and the control circuit according to claim 1, that controls the bridge circuit.

10. An electronic device comprising the synchronous rectifier circuit according to claim 9.

11. A wireless power receiving apparatus comprising:

a reception coil;

a bridge circuit connected to the reception coil;

the control circuit according to claim 1, that controls the bridge circuit.

12. A control circuit structured to form a synchronous rectifier circuit together with a bridge circuit, wherein the bridge circuit comprises:

a first transistor arranged between a first input node and a rectification node;

a second transistor arranged between a second input node and the rectification node;

a third transistor arranged between the first input node and a reference node; and a fourth transistor arranged between the second input node and the reference node, and wherein the control circuit comprises:

a first variable voltage source structured to generate a first threshold voltage which is variable;

a first zero current detection comparator structured to compare a first voltage at the first input node with the first threshold voltage, and to generate a first detection signal having a first level when the first voltage is higher than the first threshold voltage, and having a second level when the first voltage is lower than the first threshold voltage;

a first adjustment comparator structured to compare the first voltage with a first reference voltage;

a first adjustment unit structured to adjust the first threshold voltage generated by the first variable source, based on an output of the first adjustment comparator; and a control logic structured to switch a state of the bridge circuit according to the first detection signal, wherein the first threshold voltage is variable in the vicinity of a rectified voltage at the rectification node, wherein the first reference voltage is configured as a positive voltage that is higher than the rectified voltage, and wherein, when the first detection signal becomes the second level, the control logic instructs the bridge circuit to transit from a third state in which a pair of the second transistor and the third transistor are turned off and a pair of the first transistor and the fourth transistor are turned on, to a fourth state in which the first transistor through the fourth transistor are turned off.

13. The control circuit according to claim 12, wherein, with a forward voltage of a diode as Vf, and with the rectified voltage as $V_{RECT}$, the first reference voltage is set to be lower than ($V_{RECT}$+Vf).

14. The control circuit according to claim 12, further comprising a second zero current detection comparator that compares a second voltage at the second input node with a second threshold voltage, and that generates a second detection signal having a first level when the second voltage is higher than the second threshold voltage, and having a second level when the second voltage is lower than the second threshold voltage, wherein, when the second detection signal becomes the second level, the control logic instructs the bridge circuit to transit from a first state in which a pair of the first transistor and the fourth transistor are turned off and a pair of the second transistor and the third transistor are turned on, to a second state in which the first transistor through the fourth transistor are turned off.

15. The control circuit according to claim 14, further comprising:
   a second variable voltage source that generates the second threshold voltage which is variable;
   a second adjustment comparator that compares the second voltage with a second reference voltage configured as a positive voltage; and
   a second adjustment unit that adjusts the second threshold voltage generated by the second variable voltage source, based on an output of the second adjustment comparator.

16. The control circuit according to claim 14, wherein, when the first detection signal becomes the first level, the control logic instructs the bridge circuit to transit from the second state to the third state,
   and wherein, when the second detection signal becomes the first level, the control logic instructs the bridge circuit to transit from the fourth state to the first state.

17. The control circuit according to claim 16, wherein the first zero current detection comparator and the second zero current detection comparator are each configured as a hysteresis comparator.

18. The control circuit according to claim 14, further comprising:
   a third zero current detection comparator that compares the first voltage with a third threshold voltage, and that generates a third detection signal which indicates a comparison result; and
   a fourth zero current detection comparator that compares the second voltage with a fourth threshold voltage, and that generates a fourth detection signal which indicates a comparison result,
   wherein the control logic instructs the bridge circuit to transit from the second state to the third state according to one from among the third detection signal and the fourth detection signal,
   and wherein the control logic instructs the bridge circuit to transit from the fourth state to the first state according to the other signal from among the third detection signal and the fourth detection signal.

* * * * *